(12) United States Patent
Yang

(10) Patent No.: US 6,299,814 B1
(45) Date of Patent: Oct. 9, 2001

(54) METHOD OF FABRICATING SILICON RUBBER-BASED MOLD

(75) Inventor: Hwa-Joon Yang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/595,588

(22) Filed: Jun. 15, 2000

(30) Foreign Application Priority Data

Oct. 11, 1999 (KR) .................................. 99-43765

(51) Int. Cl.$^7$ .................................................. B29C 33/40
(52) U.S. Cl. ............................................................ 264/219
(58) Field of Search ................................. 264/219, 259, 264/261, 267

(56) References Cited

U.S. PATENT DOCUMENTS

| | | | |
|---|---|---|---|
| 2,434,780 | * 1/1948 | Wiss et al. | 264/219 |
| 2,615,229 | * 10/1952 | Blackburn et al. | 264/219 |
| 3,053,713 | * 9/1962 | Juras | 264/219 |
| 3,064,314 | * 11/1962 | Gagne et al. | 264/219 |
| 3,270,110 | * 8/1966 | Downie et al. | 264/219 |
| 3,509,250 | * 4/1970 | Knipper | 264/219 |
| 4,104,347 | * 8/1978 | Ohashi et al. | 264/219 |
| 4,349,498 | * 9/1982 | Ellis et al. | 264/219 |

FOREIGN PATENT DOCUMENTS 4-224904 * 8/1992 (JP) ..................................... 264/219

* cited by examiner

*Primary Examiner*—Allan R. Kuhns
(74) *Attorney, Agent, or Firm*—Christie, Parker & Hale, LLP

(57) ABSTRACT

A method of fabricating a silicon rubber-based mold includes the first step of making a master model of products to be formed, and a jig. The master model is mounted onto the jig, and a lower pad is formed on the master model. A plurality of round bars are inserted onto the lower pad. A lower frame is made by injecting a backing material onto the lower pad. The lower pad and the round bars are removed while leaving out an empty space and silicon injection paths there. Silicon rubber is injected into the empty space via the silicon injection paths to form a lower silicon layer, thereby completing a lower half mold. The lower half mold is then overturned. The jig is separated from the master model, and an upper pad is formed on the master model. A plurality of round bars are inserted onto the upper pad. An upper frame is made by injecting a backing material onto the upper pad. The upper pad and the round bars are removed while leaving out an empty space and silicon injection paths there. Silicon rubber is injected into the empty space to form an upper silicon layer, thereby completing an upper half mold.

4 Claims, 7 Drawing Sheets

METHOD OF FABRICATING SILICON RUBBER-BASED MOLD

BACKGROUND OF THE INVENTION (a) Field of the Invention

The present invention relates to a method of fabricating a silicon rubber-based mold and, more particularly, to a method of fabricating a silicon rubber-based mold which contains minimum amount of silicon rubber and improves molding characteristics of the product to be formed.

(b) Description of the Related Art

Generally, rim molds or vacuum casting molds that are mainly used for the casting purpose involve high production cost and retarded production time because they should be fabricated separately in accordance with the shape of the required products. Therefore, in case various kinds of products should be formed in a small scale, the molds based on silicon rubber or epoxy resin have been extensively used.

FIGS. 3A to 3D illustrate the processing steps of fabricating a silicon rubber-based mold according to a prior art. As shown in FIG. 3A, a jig 112, and a master model 114 of products to be formed are first made. Thereafter, as shown in FIG. 3B, the master model 114 is mounted onto the jig 112. As shown in FIG. 3C, the master model 114 mounted on the jig 112 is inserted within a casting enclosure, and then, silicon rubber is injected onto the master model 114 to thereby form a lower half mold 116. The lower half mold 116 is overturned, and the jig 112 is separated from the master model 114. Thereafter, silicon rubber is again injected onto the master model 114 to thereby form an upper half mold 118. Finally, the master model 114 is removed from its place while leaving out an empty space for forming the required products there.

Silicon rubber used in such a process is flexible, and coefficient of thermal expansion thereof is up to 0.01. Therefore, considering that the product formation using a mold is performed under the high pressure of 1–1.5 MPa, the above structured mold that is entirely based on silicon rubber is liable to suffer serious transformation due to its high thermal expansion, and causes poor dimensional precision of the resulting products.

On the other hand, the mold based on epoxy resin involves complicated processing steps due to physical properties of the epoxy resin. Furthermore, since the required flexibility is absent in the epoxy resin-based mold, serious transformation of the product is generated at mold release.

SUMMARY OF THE INVENTION

It is an object of the present invention to provide a method of fabricating a silicon rubber-based mold which can enhance dimensional precision of the product to be formed.

This and other objects may be achieved by a mold fabricating method including the first step of making a master model of products to be formed, and a jig. The master model is mounted onto the jig, and a lower pad is formed on the master model. A plurality of round bars are inserted onto the lower pad. A lower frame is made by injecting a backing material onto the lower pad. The lower pad and the round bars are removed from their places while leaving out an empty space and silicon injection paths there. Silicon rubber is injected into the empty space via the silicon injection paths to form a lower silicon layer, thereby completing a lower half mold. The lower half mold is then overturned. The jig is separated from the master model, and an upper pad is formed on the master model. A plurality of round bars are inserted onto the upper pad. An upper frame is made by injecting a backing material onto the upper pad. The upper pad and the round bars are removed from their places while leaving out an empty space and silicon injection paths there. Silicon rubber is injected into the empty space to form an upper silicon layer, thereby completing an upper half mold.

A metallic mesh may be fixed to the upper frame before the step of injecting silicon rubber into the empty space. The metallic mesh is to securely fix the upper silicon layer to the upper frame.

Silica or a mixture of resin and silica may be used as the backing material for forming the upper and lower frames.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

FIGS. 1A to 1H illustrate the processing steps of fabricating a silicon rubber-based mold according to a first preferred embodiment of the present invention.

Figure 1A:
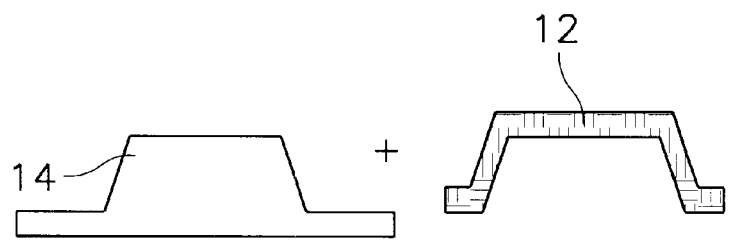
FIGS. 1A to 1H are sectional views illustrating the processing steps of fabricating a silicon rubber-based mold according to a first preferred embodiment of the present invention.

As shown in FIG. 1A, a master model 12 of products to be formed, and a jig 14 are first made. In order to make the master model 12, a prototype of Styrofoam is prepared, and numerical control (NC) processing is performed with respect to the prototype. The boss or rib portions are preliminarily deposited with resin before the NC processing.

Figure 1B:
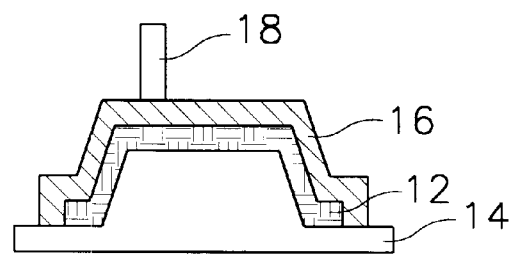

Thereafter, as shown in FIG. 1B, the master model 12 is mounted onto the jig 14, and then overlaid with a lower pad 16 having a thickness of about 10–15mm. A plurality of round bars 18 are inserted onto the lower pad to make paths for injecting silicon rubber.

Figure 1C:
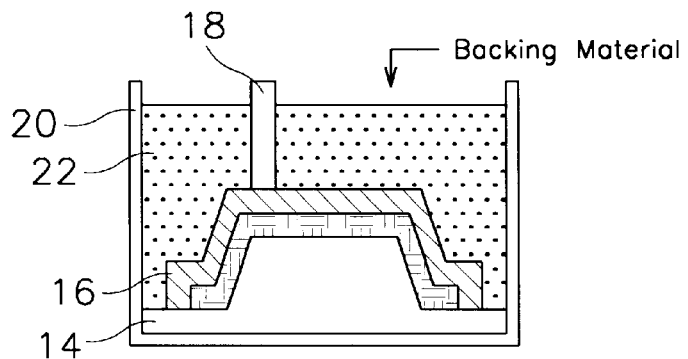

Then, as shown in FIG. 1C, the master model 12 is inserted within a casting enclosure, and a backing material is injected onto the lower pad 16 to thereby form a lower frame 22.

Silica has advantages for the backing material such as high refractoriness, low shrinkage at cooling, and economic cost. However, since silica has weak bondage strength, it is preferable that a mixture of silica and resin is used as the backing material. Alternatively, epoxy resin may be also used as the backing material.

Figure 1D:
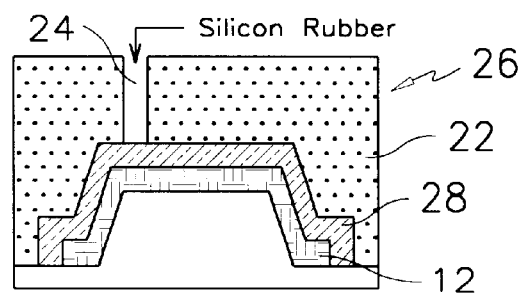

After the lower frame 22 is formed, the lower pad 16 and the round bars 18 are removed from their places while leaving out an empty space and silicon injection paths 24 there. As shown in FIG. 1D, silicon rubber is injected into the empty space via the silicon injection paths 24 to thereby form a lower silicon layer 28. In this way, the formation of a lower half mold 26 is completed.

In the resulting lower half mold 26, the lower silicon layer 28 is interposed between the lower frame 22 and the master model 12 without any separate fixture. This structure makes it possible that when any product is cast in the mold and released from the mold, the lower silicon layer 28 is also released together with the product. In this way, mold release can be easily performed, and possible damage due to the mold release can be minimized.

Figure 1E:
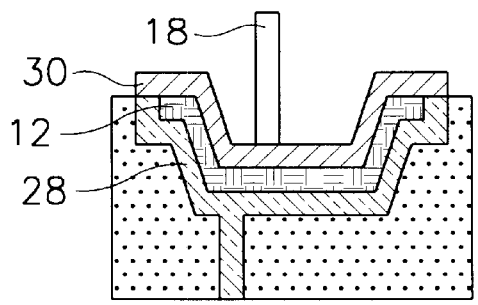

On the other hand, in order to form an upper half mold 36, the lower half mold 26 is overturned. As shown in FIG. 1E, the jig 14 is separated from the master model 12, which is in turn overlaid with an upper pad 30. A plurality of round bars 18 are inserted onto the upper pad 30.

Figure 1F:
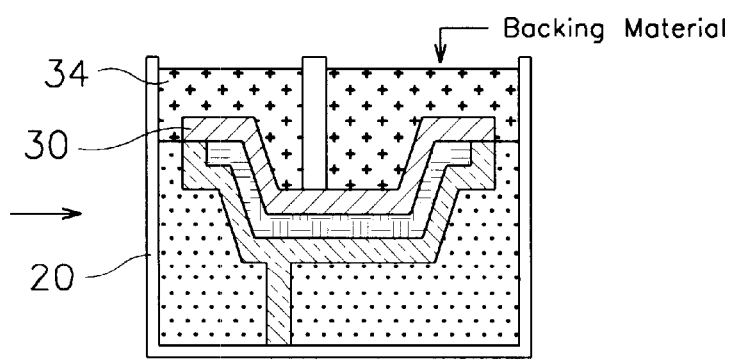

As shown in FIG. 1F, the master model 12 is then inserted within a casting enclosure 20, and a backing material is injected onto the upper pad 30 to thereby form an upper frame 34.

Silica or a mixture of silica and resin may be used as the backing material.

Figure 1G:
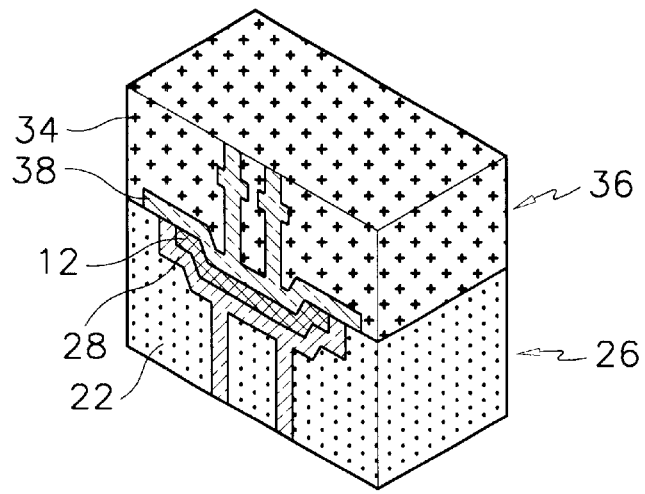

After the upper frame 34 is formed, the upper pad 30 and the round bars 18 are removed from their places while leaving out an empty space and silicon injection paths 24 there. As shown in FIG. 1G, silicon rubber is injected into the empty space via the silicon injection paths 24 to thereby form an upper silicon layer 38. In this way, the formation of the upper half mold 36 is completed.

Oil breed typed silicon rubber is used for forming the upper silicon layer 38 so that the upper silicon layer 38 can be easily detached from the product to be formed.

Figure 1H:
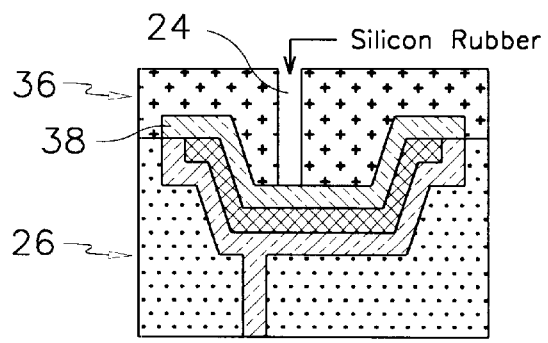

Finally, as shown in FIG. 1H, the master model 12 is removed from its place to thereby form an empty space for product casting there. In this molding structure, it naturally follows that the upper silicon layer 38 contacts a top surface of the product to be formed, whereas the lower silicon layer 28 contacts a bottom surface of the product.

Figure 2A:
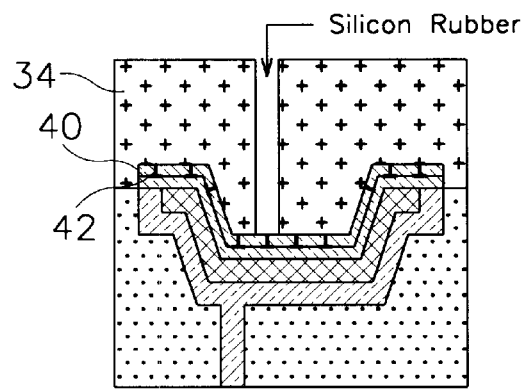
FIGS. 2A and 2B are sectional views illustrating the processing steps of fabricating a silicon rubber-based mold according to a second preferred embodiment of the present invention.
Figure 2B:
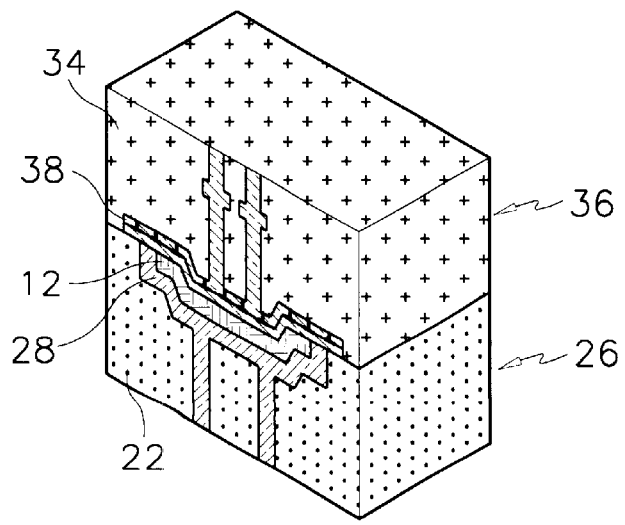
Figure 3A:
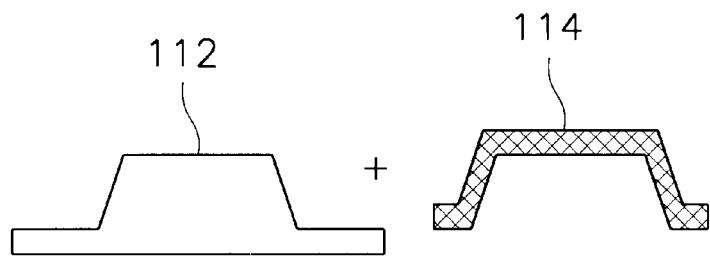
FIGS. 3A to 3D are sectional views illustrating the processing steps of fabricating a silicon rubber-based mold according to a prior art.
Figure 3B:
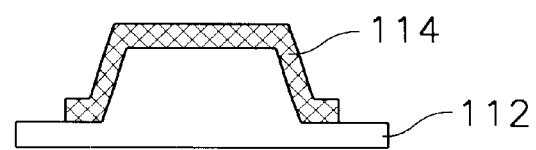
Figure 3C:
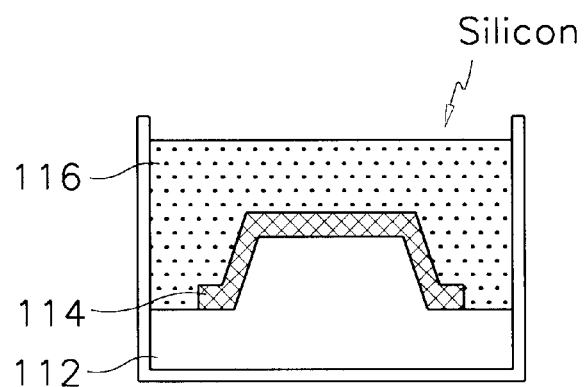
Figure 3D:
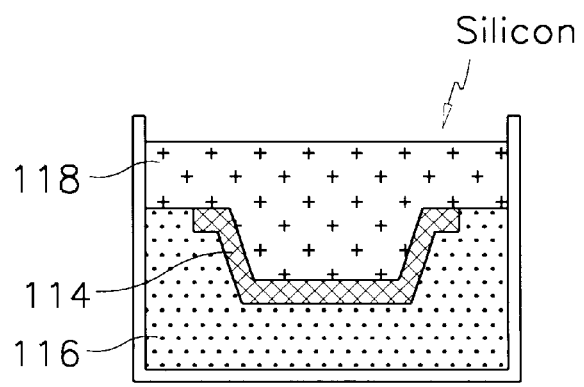

FIGS. 2A and 2B illustrate the processing steps of fabricating a silicon rubber-based mold according to a second preferred embodiment of the present invention. In this preferred embodiment, other processing steps of fabricating the silicon rubber-based mold are the same as those related to the first preferred embodiment except that the step of positioning a separate fixation member is newly introduced before the step of injecting silicon rubber into the empty space to form an upper silicon layer 38.

As shown in FIG. 2A, a fixture 40 of metallic mesh is fixed to a bottom surface of the upper frame 34 by using coupling bolts 42. The fixture 40 is to securely fix the upper silicon layer 38 to the upper frame 34. The entire structure of the resulting mold with such a fixture 40 is specifically illustrated in FIG. 2B.

In the above structure, the upper silicon layer 38 fixed to the upper frame 34 is easily separated from the product at mold release so that the product does not suffer any damage due to the mold release.

As described above, in the inventive method of fabricating a silicon rubber-based mold, silicon rubber is used only in the portions of the mold contacting the product to be formed so that transformation of the mold due to the thermal expansion of the silicon rubber component is minimized and dimensional precision of the resulting product is enhanced. Furthermore, the product can be easily released from the mold without suffering any damage due to the mold release.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of fabricating a silicon rubber-based mold, the method comprising the steps of:

making a master model of products to be formed, and a jig;

mounting the master model onto the jig, forming a lower pad on the master model, and inserting a plurality of round bars onto the lower pad;

making a lower frame by injecting a backing material onto the lower pad;

removing the lower pad and the round bars while leaving an empty space and silicon injection paths there, injecting silicon rubber into the empty space via the silicon injection paths to form a lower silicon layer, thereby completing a lower half mold;

overturning the lower half mold, separating the jig from the master model, forming an upper pad on the master model, and inserting a plurality of round bars onto the upper pad;

making an upper frame by injecting a backing material onto the upper pad; and removing the upper pad and the round bars while leaving an empty space and silicon injection paths there, injecting silicon rubber into the empty space to form an upper silicon layer, thereby completing an upper half mold.

2. The method of claim 1 further comprising the step of fixing a metallic mesh to the upper frame before the step of injecting silicon rubber into the empty space to form an upper silicon layer, the metallic mesh securely fixing the upper silicon layer to the upper frame.

3. The method of claim 1 wherein silica is used as the backing material for forming the upper and lower frames.

4. The method of claim 1 wherein a mixture of resin and silica is used as the backing material for forming the upper and lower frames.

* * * * *